US009588897B2

(12) United States Patent
Clausen et al.

(10) Patent No.: US 9,588,897 B2
(45) Date of Patent: Mar. 7, 2017

(54) ADAPTIVE APPLICATION CACHING FOR MOBILE DEVICES

(71) Applicant: Samsung Electronics Co. Ltd., Swon-si, Gyeonggi-do (KR)

(72) Inventors: William Stryker Clausen, Kirkland, WA (US); Andrew Mast, Issaquah, WA (US)

(73) Assignee: Samsung Electronics Co., Ltd., Suwon-si (KR)

(*) Notice: Subject to any disclaimer, the term of this patent is extended or adjusted under 35 U.S.C. 154(b) by 174 days.

(21) Appl. No.: 13/946,856

(22) Filed: Jul. 19, 2013

(65) Prior Publication Data

US 2015/0026415 A1    Jan. 22, 2015

(51) Int. Cl.
*G06F 12/10* (2016.01)
*G06F 12/08* (2016.01)
*H04L 29/08* (2006.01)

(52) U.S. Cl.
CPC ...... *G06F 12/0862* (2013.01); *G06F 12/0802* (2013.01); *H04L 29/08* (2013.01); *G06F 12/0804* (2013.01); *G06F 12/0806* (2013.01); *G06F 2212/171* (2013.01)

(58) Field of Classification Search
CPC ............. G06F 12/0862; G06F 12/0888; G06F 12/0802; G06F 12/0804; G06F 12/086; G06F 2212/602; G06F 12/0806
USPC ................................................. 711/118, 137
See application file for complete search history.

(56) References Cited

U.S. PATENT DOCUMENTS

| 7,054,649 | B2 | 5/2006 | Yamazaki et al. | |
|---|---|---|---|---|
| 2005/0034129 | A1* | 2/2005 | Chew | 718/100 |
| 2008/0005736 | A1* | 1/2008 | Apacible et al. | 718/100 |
| 2010/0106852 | A1* | 4/2010 | Kindig et al. | 709/231 |
| 2010/0153007 | A1* | 6/2010 | Crowley | 701/206 |
| 2012/0317370 | A1* | 12/2012 | Luna | 711/146 |
| 2012/0324481 | A1 | 12/2012 | Xia et al. | |
| 2015/0134913 | A1* | 5/2015 | Huang et al. | 711/135 |
| 2015/0278098 | A1* | 10/2015 | Zhang et al. | 711/135 |

FOREIGN PATENT DOCUMENTS

| KR | 2000-0037573 A | 7/2000 |
|---|---|---|
| KR | 20000054261 A | 9/2000 |
| KR | 10-2011-0139595 A | 12/2011 |
| KR | 10-2012-0018608 A | 3/2012 |

* cited by examiner

*Primary Examiner* — Than Nguyen
(74) *Attorney, Agent, or Firm* — Jefferson IP Law, LLP

(57) ABSTRACT

A method for pre-loading contents in a cache of a mobile terminal, and a mobile terminal using the method, are provided. The method includes determining specific contents for pre-loading, determining circumstances for pre-loading the specific contents, and monitoring circumstances of the mobile terminal. If the circumstances for pre-loading are detected, the method determines whether the specific contents are already present in cache, and if the specific contents are not present in cache, loads the specific contents into the cache when the circumstances for pre-loading are detected.

36 Claims, 7 Drawing Sheets

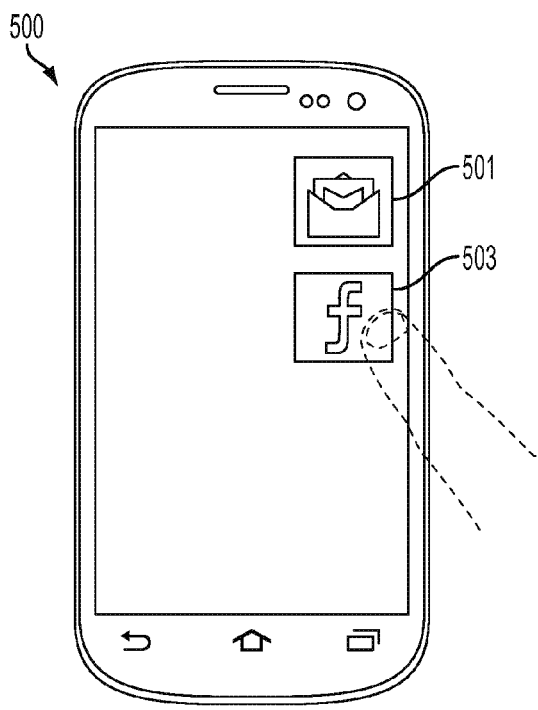
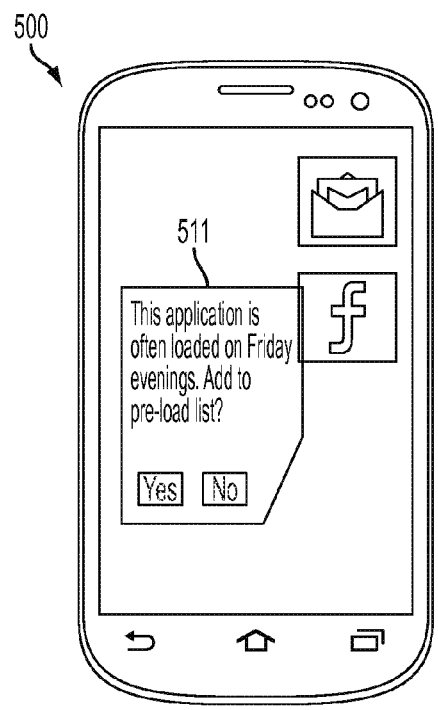
FIG. 5A  FIG. 5B
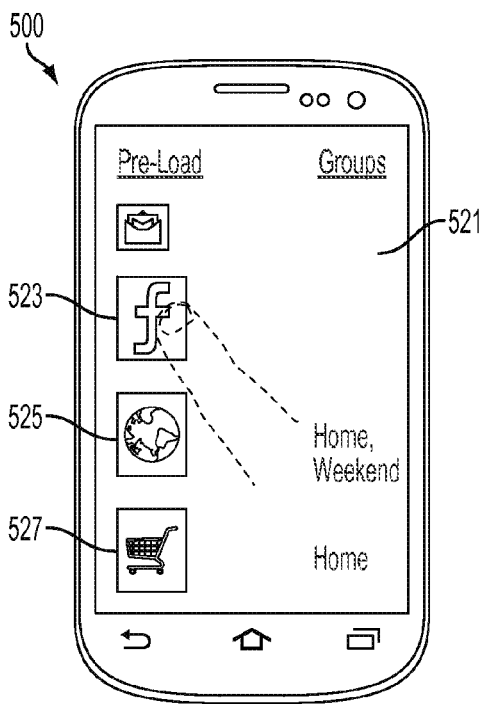
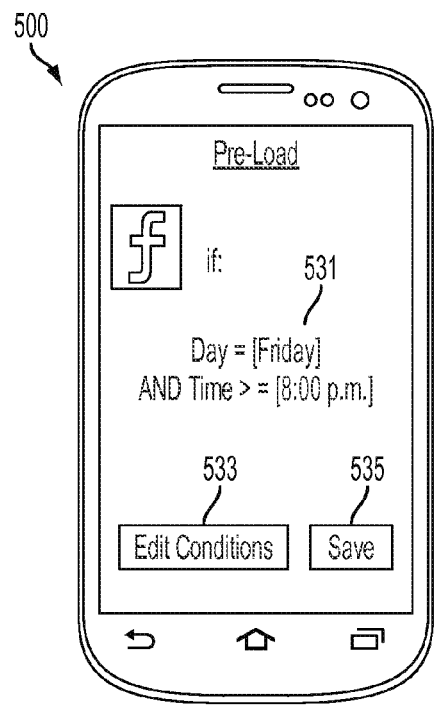
FIG. 5C  FIG. 5D

ADAPTIVE APPLICATION CACHING FOR MOBILE DEVICES

BACKGROUND OF THE INVENTION

1. Field of the Invention

The present invention relates to a method of improving application caching in a digital device. More particularly, the present invention relates to a method of pre-loading in memory or pre-starting applications in anticipation of near future usage according to current circumstances.

2. Description of the Related Art

A mobile terminal, such as a smartphone or a tablet computer, is typically limited in the amount of memory that may be installed due to size, weight, and price concerns. The mobile terminal may therefore attempt to execute applications which use all available memory. In operating systems such as LINUX or Android (a mobile phone operating system based on the LINUX kernel), conventional memory management techniques include selecting applications to kill based on static process information. Thus, whereas a desktop computer can be provided with a large amount of memory to increase its capabilities, it is not correspondingly possible to keep a significant number of applications running concurrently in a mobile device due to the available memory constraints.

A mobile device will typically have some applications that can be started or stopped as required, and other applications which are effectively always running. For example, a smart phone will always be running a telephone application, to maintain contact with the telephone system so that the user can receive telephone calls. If the telephone application were only running when the user desired to use it, the user would effectively be limited to only making outgoing telephone calls.

In contrast, some applications only need to run when in actual use. A user playing a game or selecting movies from a streaming service will not lack any ability to use these applications fully even if they are only running when the user is using them.

Launch speed of applications is a key factor in the perceived performance of a mobile device. Often, several seconds of delay is noticed while launching an application due to the large number of resources that must be fetched. As these devices become more powerful and additional memory is available, it is advantageous to keep many "hot" applications ready-to-run in the background. Typically, the list of applications kept is managed by a system algorithm which orders applications so as to kill applications determined to be the least likely to be needed, when there is little or no free memory remaining.

There are methods in development to pre-launch applications according to a location or a frequency of application use. However, there has not yet been provided any means for a user to have various applications loaded into cache according to circumstances such as proximity to various entities, user environment such as "work", "family", or "friends", scheduled events, etc. Further, there has been no means provided to pre-load particular data into cache according to such circumstances.

Therefore, a need exists for a system and method for adaptively pre-loading into cache applications and data in accordance with a user's needs.

The above information is presented as background information only to help understand the present invention. Applicants have made no determination and make no assertion as to whether any of the above might be applicable as Prior Art with regard to the present application.

SUMMARY OF THE INVENTION

Aspects of the present invention are to address at least the above-mentioned problems and/or disadvantages and to provide at least the advantages described below. Accordingly, an aspect of the present invention is to provide an apparatus and method for adaptively caching applications in a mobile device.

In accordance with an aspect of the present invention, a method for pre-loading contents in a cache of a mobile terminal is provided. The method includes determining specific contents for pre-loading, determining circumstances for pre-loading the specific contents, and monitoring circumstances of the mobile terminal. If the circumstances for pre-loading are detected, the method determines whether the specific contents are already present in cache, and if the specific contents are not present in the cache, the method loads the specific contents into the cache when the circumstances are detected.

In accordance with another aspect of the present invention, a mobile terminal is provided. The mobile terminal includes a cache, an input-output unit, and at least one processor. The at least one processor determines specific contents for pre-loading into the cache, determines circumstances for pre-loading the specific contents, and monitors circumstances in the mobile terminal. If the circumstances for pre-loading are detected, the at least one processor determines whether the specific contents are already present in the cache, and if the specific contents are not present in cache, the at least one processor loads the specific contents into the cache when the circumstances for pre-loading are detected.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 5A-5D show the use of a mobile terminal according to an exemplary embodiment of the present invention;

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 through 7C, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Figure 1:
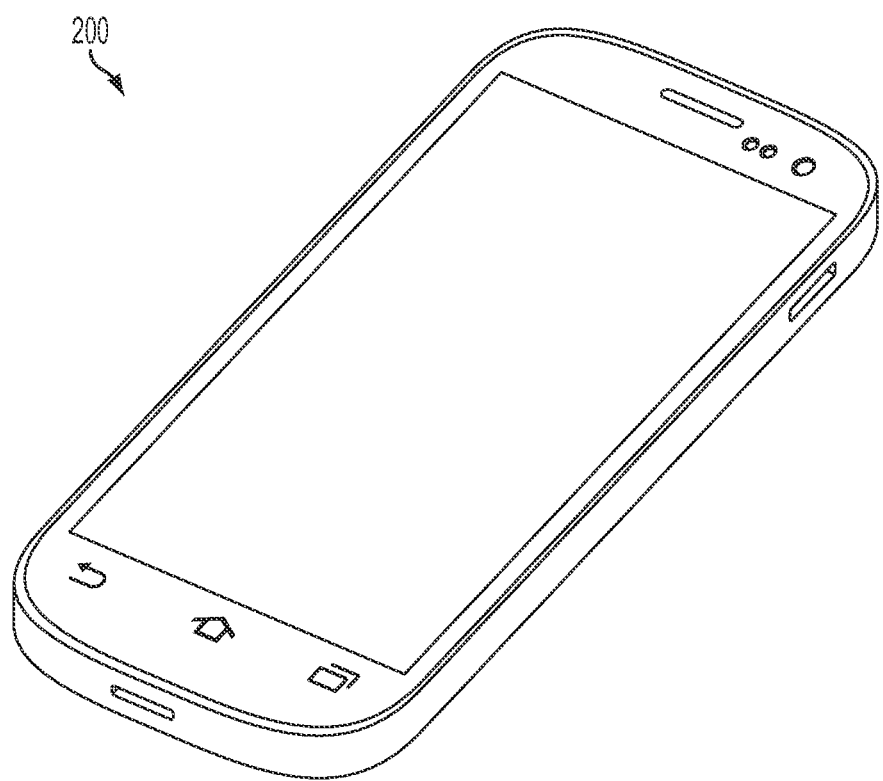
FIG. 1 is a perspective view of a mobile terminal according to an exemplary embodiment of the present invention.

FIG. 1 is a perspective view of a mobile terminal according to an exemplary embodiment of the present invention.

Referring to FIG. 1, a mobile terminal 200 which may be embodied in a tablet computer or a smart phone, is typically limited in the cache provided. For example, only a limited amount of cache is available for loading data and executable applications. In particular, executable applications are loaded into the cache from a main memory or from a remote server, and are executed from the flash memory. There may thus be a significant delay in loading a large application to the cache before the application can be executed.

The user of a mobile terminal may not be able to expand or augment the cache on the device. Each system application and user application stored or running on the device requires cache. As applications are selected, they must be loaded into the cache. As applications are closed or not used, they may be removed from the cache if there is insufficient cache available to run all desired applications. If a user attempts to execute too many applications concurrently, all available cache may be filled and there may not be sufficient cache available to open additional applications. Thus, a user running applications that use enough total memory may encounter a condition where the device has insufficient free memory to allocate for running additional applications.

Figure 2:
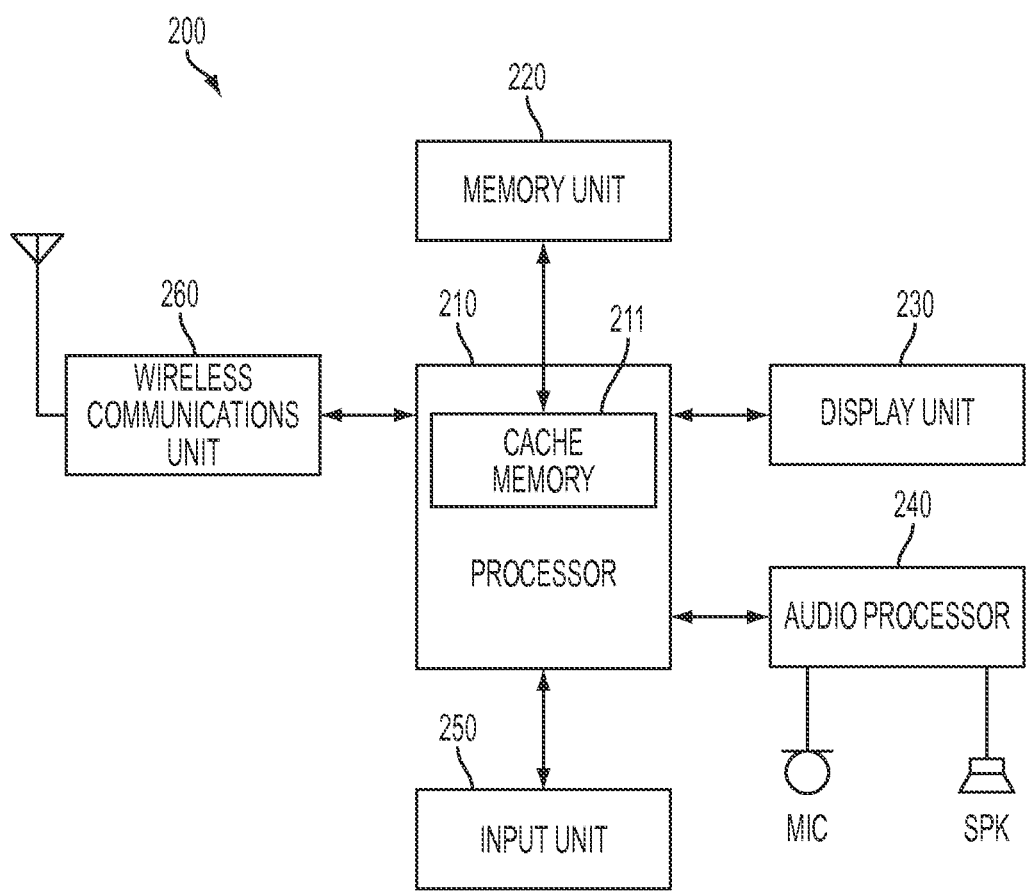
FIG. 2 is a functional block diagram illustrating the mobile terminal of FIG. 1 according to an exemplary embodiment of the present invention.

FIG. 2 is a functional block diagram illustrating the mobile terminal of FIG. 1 according to an exemplary embodiment of the present invention.

Referring to FIG. 2, a mobile terminal 200 includes at least one processor 210 and a memory unit 220. The memory unit 220 stores both executable code and data. The executable code may include both system software such as an operating system, and user applications. The processor 210 also includes a cache 211. The cache 211 is where application software is loaded when executed. The processor 210 can access the cache 211 much faster than the memory unit 220, but the cache 211 has a much smaller capacity than the memory unit 220. In an exemplary embodiment, applications and data in active use will be loaded from the main memory unit 220 into the cache 211.

The mobile terminal typically includes a display unit 230, an audio processor 240, and an input unit 250. The input unit 250 and display unit 230 may be combined as a single unit, for example, a touch screen. The audio processor 240 uses a microphone MIC for audio input and a speaker SPK for audio output. The mobile terminal may also be configured to include a wireless communication unit 260.

When an application executes on the mobile terminal, the application has cache allocated for its use, and then the program is loaded into the cache. Typically, the applications in the storage memory occupy far more memory space than is available in the cache. Therefore, the operating system includes a Memory Management (MM) function to allocate cache when an application requires it. The MM will also de-allocate cache that an application no longer requires, so that the cache can be made free and available for other programs to use. Some applications, such as the operating system and a telephone function, may be kept loaded and running in cache essentially at all times. Other applications, such as games or an email application, might only be loaded into the cache when invoked or executed.

A user of a mobile device will typically have access to a list of applications installed in the device that can be started, stopped, uninstalled, etc., as the user chooses. Applications that are essential for mobile device operation, such as a telephone application, are typically not listed among the applications the user can start and stop in this manner; instead, they may only be configured by the user. For example, a user may select a different ringtone and picture to be displayed when receiving a call, according to the identity of the caller.

With regard to applications that are not required to always be running in this manner, the user may desire to keep one or more applications loaded or running in memory in certain circumstances, in order to avoid the fetch and initialization time delays. The user may have several applications that he relies on while at work, for example, email, access to a Virtual Private Network (VPN), etc. The user may further have several applications that he wishes to keep readily available for use at home, for example, a streaming video selection application, a recipe guide, a favorite solo game, etc. The user may have other applications that he wishes to keep readily available in other circumstances, for example, a navigation program when he is in his car, a multiplayer linked game when he is socializing with certain friends, etc.

The user thus selects one or more applications that he wishes to load automatically in memory or start running in the background according to circumstances. For each application, the user has the option to add the application to one or more groups. For example, the user might have an "at work" group of applications that he wishes to be running and available during normal work hours. The user can define the groups in any manner that convenient or intuitive to him. Further, an application can be a member of more than one such group.

For each such group that the user defines, each application that is a member of the group will be loaded in memory or launched in the background according to the group's criteria. For example, if the group is "at work," the user may define the circumstances to include at least the hours 9:00 a.m. to 6:00 p.m., Monday-Friday, i.e., the user's normal work schedule. Thus, any "work" applications will be loaded in the memory and ready for use without delay during the scheduled hours. Any days of the week, days of the month, particular dates, times of day, etc., can be used as criteria to determine whether to load applications into the memory.

More launch criteria can be added for a group. For example, the user may decide that he also wants the "at work" group of applications to be ready whenever his mobile device detects his office WiFi router, so that the applications will be ready if he ever works extra hours. Thus, if the user stops by the office briefly on a weekend, his "work" applications will load into the memory as he enters the vicinity of the office WiFi router. Any detectable signal, such as a wireless router, a mobile terminal such as a smart phone or tablet computer, etc., can be used as criteria to determine whether to load applications into memory.

For another example, locations can be used as launch criteria. Locations may be determined by any means, such as vicinity of an identified router, triangulation between known signal sources, Global Positioning System (GPS) signal reception, a check-in service (such as Foursquare/Yelp/Facebook), scanning camera images, voice input mentioning location information, Near Field Communications (NFC), etc.

Applications can also be scheduled for loading into memory. For example, a user might know that he will be attending a family holiday gathering on a particular date. He can enter the group "family" in his calendar for that date, and applications associated with the "family" group will then be loaded into memory on that date.

Any such criteria for launching or loading applications in memory can be combined. The user may thus determine, for example, to load the "family" group of applications whenever he is located at his parents' house and whenever he has entered the group "family" on his calendar.

The above description uses the launching of applications as an example. However, any data or files can be loaded into memory in the same manner. For example, the user may include his photo gallery among the entries he wishes to load under the group "family." Thus, even if he is unable, for example, to get a good signal when visiting his parents, he will still be able to share photographs with them because they have been loaded into memory as part of the "family" group.

Any source may be used for the applications or data loaded into memory. For example, the user may normally store his photographs on an online picture sharing site on a social media site. The data may be selected either entirely or according to any organization available, such as photo albums or metadata. The user may wish only for pictures in his album Children to load for the "family" group, and no pictures from his album Project. Similarly, the user may wish to load any photos that include particular metadata, such as a tag indicating people in the photograph, a location of the photograph, a date or time of the photograph, etc.

Any data or application can be included in multiple groups. For example, a user who runs a family business may include his wife's mobile terminal as included in both the "work" and "family" groups.

Any data or application can be designated for loading into memory without regard to whether it is part of any group. The user may thus, for example, choose to load his resume into memory on the date he is scheduled to attend a job fair. Thus, even if he has no signal to download documents stored on servers while at the job fair, his resume will still be loaded for him to provide to employers.

In the above description, the user selects the applications and data that he wishes to load to memory under various circumstances. However, the present invention is not limited thereto.

For example, the operating system of the mobile terminal can track the various circumstances when applications are launched or data is loaded, for example, as metadata. The system can then detect patterns of use and suggest to the user that he add applications or data to existing groups that follow similar usage patterns. If no group has a similar usage pattern, the system can suggest adding a new group, or simply ask if the user wishes to pre-load the application or data under such circumstances. The operating system can be set to prompt the user when the usage pattern exceeds any predetermined threshold. The predetermined threshold can be based on any detectable criteria or combination thereof, such as location, time of day, day of the week or month, date, frequency of use, proximity to signals, presence of particular events on the calendar, etc.

Thus, for example, if the user loads project notes each time he has a meeting scheduled with his boss or a particular client, the system can detect that and ask the user if he wants to pre-load those project notes whenever his boss's mobile terminal is detected or whenever his calendar includes a scheduled meeting with the boss or the client.

In an exemplary embodiment of the present invention, a mobile terminal can determine when it is or expects to be in proximity to particular people, and pre-load data or applications accordingly.

For example, a user may copy an entry from his address book to his calendar when he has a meeting or a date scheduled with a particular person. The mobile terminal may also have a signal of the particular person's smart phone entered in the address book. Thus, the mobile terminal may determine both applications and data that should be pre-loaded before a scheduled meeting or date with the person, and may also search data such as email messages, text messages, photograph tags, etc., when the person's smart phone signal is detected. The mobile terminal can then load into memory any applications or data that are determined to relate to that person, such as any message to or from the person, any message in which that person is identified, any photograph in which that person is tagged, any data or social applications related to the person or to the person's information in a phone book, any application which has been previously used to interact with that person (for example, a multi-player game), etc.

In addition to being added to groups, circumstances can be defined for loading or starting individual applications. For example, if the user has a multiplayer game he plays whenever he gets together with a specific group of one or more friends, he may configure that game to launch whenever mobile devices belonging to those specific friends are all detected in proximity to the mobile device concurrently. That is, even if the user does not wish all information related to those friends to pre-load, he may still configure particular content such as the game to preload on a basis of detecting proximity to those particular one or more friends.

The mobile terminal can be configured to launch particular applications when particular circumstances are detected. For example, the user may enjoy playing a particular multiplayer game with his friends Adam, Bob, and Charlie. The mobile terminal can be configured to load that game into memory whenever all three of Adam, Bob, and Charlie are determined to be present, either by schedule/calendar or by detection of their respective smart phones or tablet computers. The game can be loaded into memory by default when the three friends are determined to be in proximity, or the option of loading the game into memory in such circumstances can be suggested to the user for inclusion or exclusion. That is, applications and/or data can be designated for pre-loading into memory based on threshold criteria, or may alternatively be suggested to the user based on threshold criteria and only designated for pre-loading when the user specifically chooses so.

The mobile terminal can similar be configured to determine that particular applications or data are likely to be used based on any other criteria. The user may frequently use a price comparison application whenever he is in a shopping mall, for example. The user may share photographs frequently with his mother's smart phone, for another example.

Figure 3:
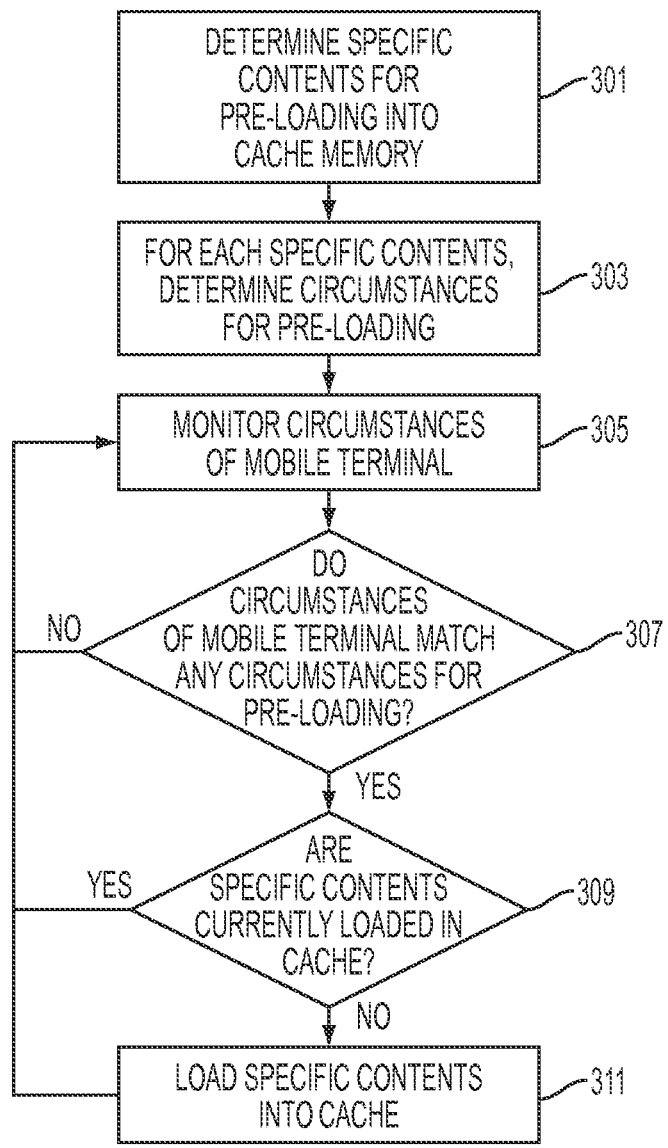
FIG. 3 is a flowchart illustrating a method for pre-loading contents in a cache of a mobile terminal according to an exemplary embodiment of the present invention.

FIG. 3 is a flowchart illustrating a method for pre-loading contents in a cache of a mobile terminal according to an exemplary embodiment of the present invention.

Referring now to FIG. 3, in step 301 specific contents for pre-loading are determined. The specific contents may include, for example, an executable application, a document, a photo album, etc. In a typical use, an executable application will be loaded from non-volatile memory, to decrease a wait for the application to load. In another typical use, a photo album will be loaded from an external server, cloud storage, a social networking service, etc. If the specific contents includes data loaded from storage not on the mobile device such as the external server, etc., then pre-loading the data contents will provide benefits of both reducing a normal download time, and making the data contents available to the user even when a usable connection to the network is not available. The specific contents may be in a form of a list. The list may include at least one specific application, at least one data item, or at least one named group. The named group may be in a form of a list, comprising the same types of entries—for example, at least one specific application, at least one data item, or at least one group. If the group includes another group, the other group should not include the first group, so as to avoid a recursive loop. If specific contents includes a group, then all contents of that group are considered to be specific contents for pre-loading.

In step 303, circumstances for pre-loading the specific contents into the cache are determined. The circumstances may include, for example, powering on the mobile terminal, a state of the mobile terminal, a local time, a geographic location, a detection of at least one predetermined wireless signals, and a proximity to at least one person, place, object, or signal. Power on the mobile terminal would thus pre-load specific contents at startup. The state of the mobile terminal may include any state, for example, an idle mode, a locked screen, during a telephone call, during a "silent" mode, etc. The state of the mobile terminal is not limited to an operational state, but may include other circumstances, for example, a velocity, a direction, an orientation, received news information, and received or detected information of a determined environment of the mobile terminal such as a local temperature or local weather. The geographic location may be determined by any available means, including a Global Positioning System (GPS) receiver, triangulating from cellular phone towers, a visual (camera) input from which location can be determined, a microphone (voice) input from which location can be determined, etc. Proximity to a person may be determined by any available means, including a scheduled meeting with the person, detection of a signal from the person's mobile terminal or phone, information obtained from a check-in service such as provided by Foursquare, Yelp, Facebook, etc. Proximity to a place may be determined by any available means, including a GPS signal, a recognized WiFi signal, a Zigbee signal, a Z-wave signal, etc. Proximity to a signal may be determined by detecting a minimum signal strength, etc. Thus, for example, the camera input can include a picture or video image including at least one unique recognized person, place, landmark, or object. The mobile terminal may then determine proximity to the person from recognizing the person's face in a picture, or may determine a location by recognizing a particular landmark or unique object.

It is noted that each specific contents will have corresponding circumstances for pre-loading. The circumstances may be the same for different specific contents but that is not required and they will often differ in practice.

In step 305, circumstances of the mobile terminal are monitored. This is performed on an ongoing or periodic basis. For example, the mobile terminal may compare the circumstances for pre-loading with available circumstance information periodically. The period may be a predetermined period of time selected by the user, determined by the manufacturer, or may be variably determined.

In step 307, the circumstances corresponding to the specific contents are compared to the monitored circumstances of the mobile terminal, and if a match is found, then the cache is checked in step 309 to determine whether the specific contents are already present in the cache. If the specific contents are not already present in the cache, then in step 311 they are loaded into the cache when the corresponding circumstances for pre-loading are determined to be matched by the circumstances of the mobile terminal.

Figure 4:
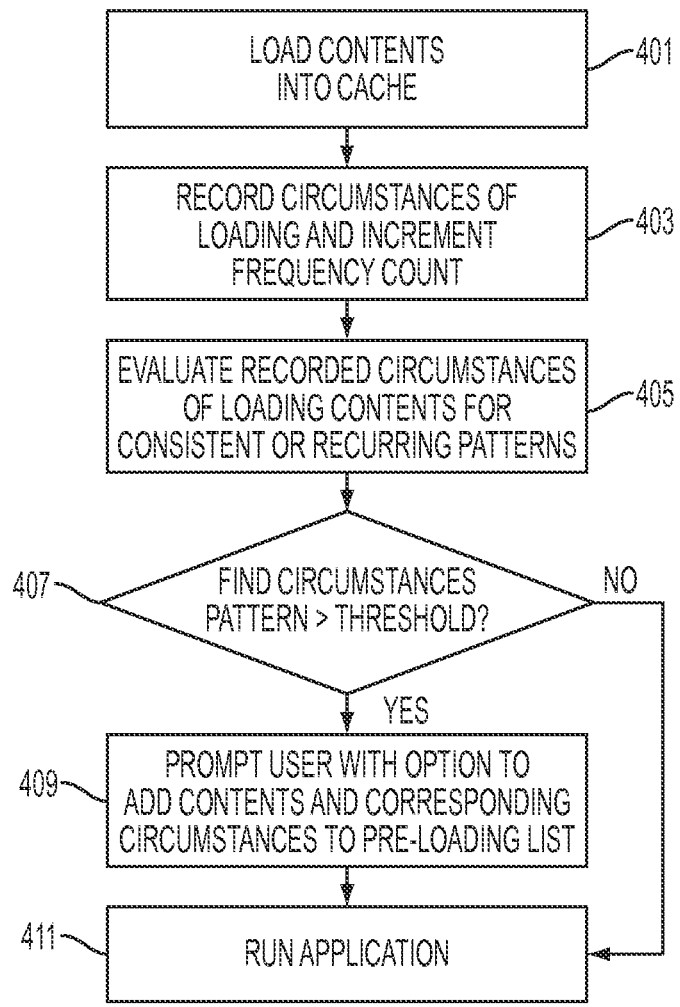
FIG. 4 is a flowchart showing steps of a method for determining applications to select for pre-loading according to an exemplary embodiment of the present invention.

FIG. 4 is a flowchart showing steps of a method for determining applications to select for pre-loading according to an exemplary embodiment of the present invention.

Referring now to FIG. 4, in step 401 contents are loaded into the cache. For example, a user may attempt to launch an application, or a running application may attempt to fetch particular data.

In step 403, the circumstances of loading the contents into the cache are recorded, and an associated frequency count for the contents is incremented. Thus, if contents are loaded frequently, they can be detected as candidates for pre-loading.

In step 405, the recorded circumstances are evaluated to determine whether any consistent or recurrent patterns can be found. For example, it may be discovered that particular contents are loaded each Friday afternoon, or whenever two specific mobile device signature signals are detected. The circumstances that are evaluated are the history of circumstances for the contents, not merely the current circumstances of loading into the cache. The frequency counter must increment over a threshold value before the circumstances are evaluated. Thus, a rarely-used application will not be checked against the circumstances. Alternatively, a running total of time spent with the application or data in cache may be kept, and the circumstances may be evaluated if the total amount of time with the contents in the cache exceeds a threshold value. The present invention is not limited thereto; any appropriate criteria can be used to determine the relative or absolute frequency of loading or use of an application, and any determinable circumstances of loading may be correspondingly recorded. The threshold value may be set by the user, set by the manufacturer, or variably determined during use.

In step 407, the evaluation will have yielded a determination of whether any consistent patterns are detected. A threshold value is used to determine whether the loading circumstances have a strong enough pattern to suggest pre-loading.

If the strong enough pattern is detected, then in step 409 the mobile terminal prompts the user with the option to add the contents to the list of pre-loading contents, according to the circumstances of the found pattern. The user can accept or rejected the suggested pre-load entry. If the user accepts the contents for pre-loading, the corresponding circumstances for pre-loading can be edited by the user.

In step 411, the application loaded into the cache is run, or a running application proceeds with the requested data.

In an exemplary embodiment of the present invention, it may occur that specific contents are to be loaded into cache when the circumstances match, but the available cache is below a predetermined threshold. In this exemplary embodiment, the specific contents are prioritized. A highest priority contents is loaded first, and if the available cache is not below the threshold, a next highest priority contents is loaded, and so on.

The priority may be selected by a user. For example, the user may decide that his email application will always be a higher priority than any other contents.

The priority may be determined according to a number of corresponding detected circumstances for pre-loading. For example, the user may have one application that loads whenever his office wireless router is detected or whenever the time is during business hours during the workweek. He may have a second application that pre-loads only during business hours during the workweek. If both circumstances match, for example, the user's office router is detected and the time is during business hours during the work week, the first application would match on more circumstances than the second application, and therefore would have a higher priority than the second application has.

The priority may include weighting of specific contents. For example, the user may determine that contents in the group "work" have a higher priority weight than contents in the group "home", even though some contents may be identically included in both groups. Contents could be included in multiple groups and also listed separately, with different pre-loading circumstances applying in each case, for example.

The priority may include weighting of specific circumstances. For example, circumstances matched on proximity to a specific person may have a higher priority than circumstances matched on a geographic location.

FIGS. 5A-5D show the use of a mobile terminal according to an exemplary embodiment of the present invention.

Referring now to FIG. 5A, a mobile terminal 500 is shown in use. It will typically have icons 501, 503 on a desktop or home screen to execute applications that the user wishes to use frequently. However, such is not required, and a user may select to load an application or data according to any means of the related art. In FIG. 5A a user is selecting an application 503.

In FIG. 5B the mobile terminal has noted the circumstances of loading the application, and compared them to a history of circumstances of loading that application. Further, the mobile terminal has determined a possible pattern in the circumstances of loading of the application. The mobile terminal presents a dialogue box 511 to the user informing of the possible pattern, and asking if the user wishes to pre-load the application under those circumstances.

In FIG. 5C, the user has selected "Yes" to indicate that he wishes to add the application to the pre-load list. A pre-load screen 521 is presented with the application 523 added thereto. For each application in the pre-load list, it is indicated whether the application is a member of any pre-load groups. For example, in FIG. 5C, the application 525 is listed as being included in the groups "Home" and "Weekend", and the application 527 is also listed as being included in the group "Home." The newly added application 523 is not listed as being included in any groups in this example; however, the mobile terminal can suggest adding the application directly to a pre-load group if a group exists that matches the history of loading circumstances for the application 523. In FIG. 5C, the user selects application 523 to review the specific criteria for pre-loading.

In FIG. 5D, the pre-load information for the application is displayed for the user to review. In this example, the application load history determined that the application is often loaded in circumstances 531 of Friday nights after 8:00 p.m. Options are presented for the user to edit 533 the conditions for pre-loading or save 535 the existing pre-load conditions. Note that if the user wishes to add or delete conditions of pre-loading, the edit conditions option 533 is selected. On the other hand, if the user wishes to adjust the entries 531 for the existing conditions, he may do so directly, for example, scrolling through the days and times and selecting those he wishes to be used for pre-loading.

FIGS. 6A-6D show the use of a mobile terminal according to an exemplary embodiment of the present invention.

Figure 6A:
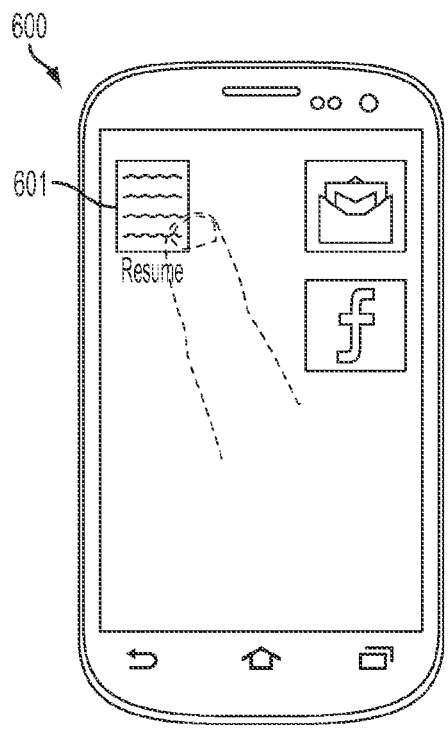
FIGS. 6A-6D show the use of a mobile terminal according to an exemplary embodiment of the present invention.
Figure 6B:
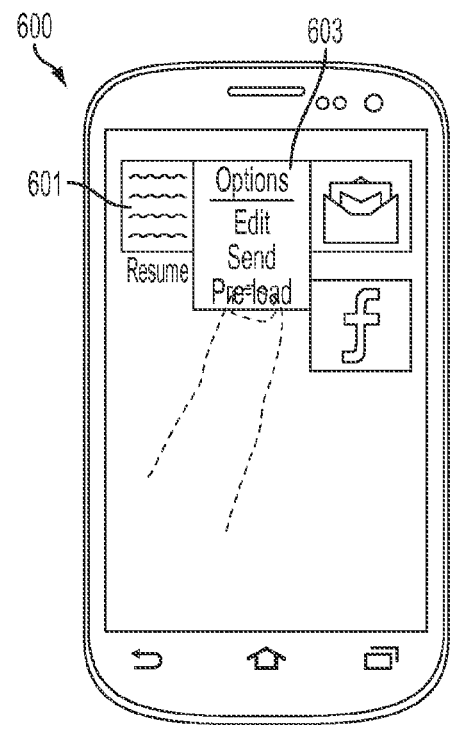

Referring now to FIG. 6A, a mobile terminal 600 includes a data document 601 "Resume" that the user wishes to pre-load, for example, prior to attending a job fair. The user selects the document 601 "Resume" and is presented with options 603, for example, to edit the document, send the document, or pre-load the document in FIG. 6B. In this example, the user selects "Pre-Load."

Figure 6C:
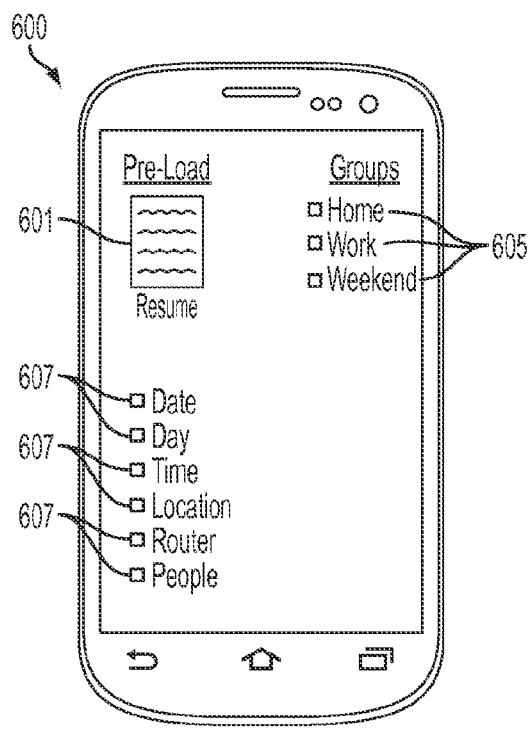

In FIG. 6C the Pre-Load entry for the document 601 "Resume" is created and displayed. The user is presented with the option to add the document 601 "Resume" to any of the existing groups 605, such as "Home," "Work," or "Weekend." The user is further presented with the option to select any criteria 607 for pre-loading, for example, "Date," "Day," "Time," "Location," "Router," and "People." Note that these criteria 607 are presented for exemplary purposes only, and any criteria that can be determined by the mobile terminal may be selected as circumstances for pre-loading.

Figure 6D:
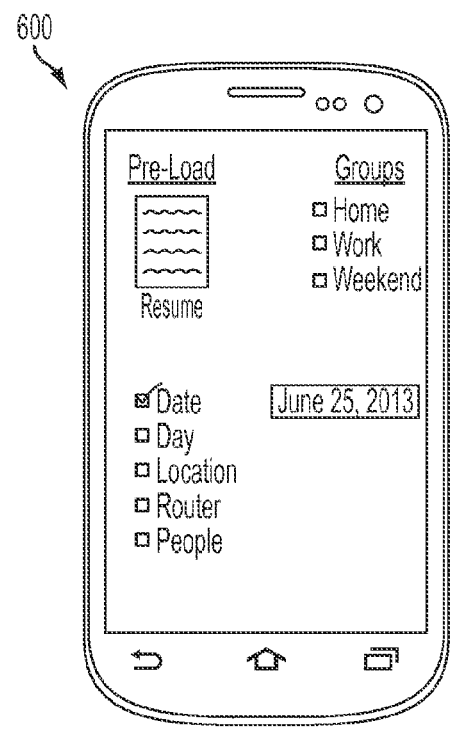

In FIG. 6D, it is assumed that the user has selected only the circumstance "Date," and has entered the specific date of the job fair, "Jun. 25, 2013." The date may be entered by any means, for example, as a text string or selected from a calendar. Thus, on the selected date, the document 601 "Resume" will be pre-loaded into cache memory, regardless of whether the user has access to where the document is stored, for example, in the cloud, on that date.

Figure 7A:
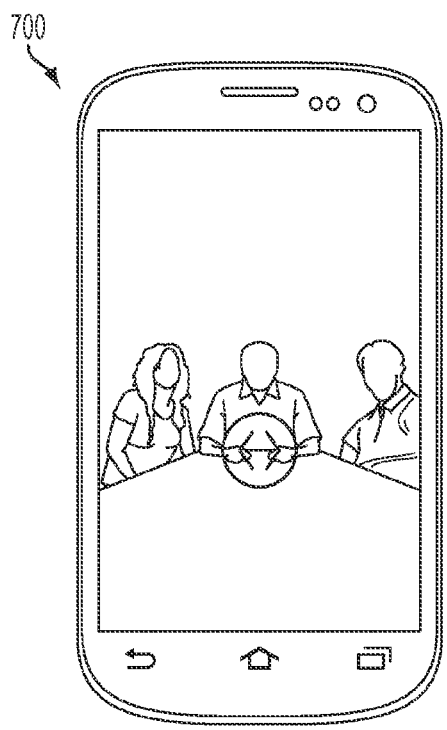
FIGS. 7A-7C show the use of a mobile terminal according to an exemplary embodiment of the present invention.
Figure 7B:
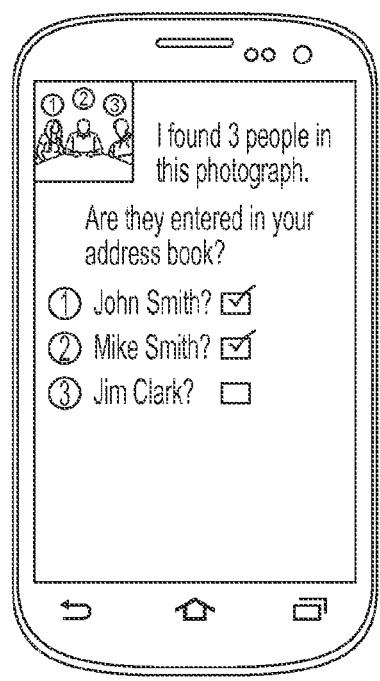
Figure 7C:
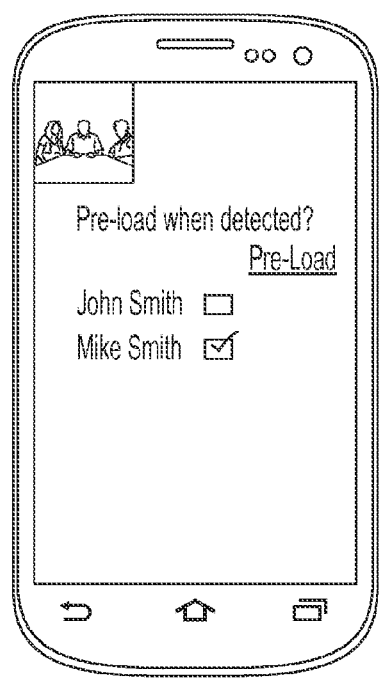

FIGS. 7A-7C show the use of a mobile terminal according to an exemplary embodiment of the present invention.

Referring now to FIG. 7A, a mobile terminal 700 is shown using a camera function. In this example, the user is taking a picture that includes three people.

In FIG. 7B, the mobile terminal detects that there are 3 people in the photograph, and compares the pictured people to information in the phone book to determine whether they are known. In this example, the mobile terminal believes that person 1 may be John Smith, person 2 may be Mike Smith, and person 3 may be Jim Clark. The user confirms that the first two people are John Smith and Mike Smith by checking the corresponding boxes.

In FIG. 7C, the mobile terminal then asks whether information for the recognized people John Smith and Mike Smith should be pre-loaded into cache memory when they are detected. In this example, the user selects Mike Smith for pre-loading. Thereafter, whenever the terminal detects the presence or proximity of Mike Smith by any means, any communications, social networking data, or other information relating to Mike Smith will be pre-loaded into cache memory. Note that the detection of the people is not limited to the camera input; for example, the entry for Mike Smith in the phone book may also include the signal from Mike Smith's mobile phone and any location-based check-in service that Mike Smith participates in.

Certain aspects of the present invention can also be embodied as computer readable code on a computer readable recording medium. A computer readable recording medium is any data storage device that can store data which can be thereafter read by a computer system. Examples of the computer readable recording medium include Read-Only Memory (ROM), Random-Access Memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of pre-loading contents in a cache of a mobile terminal, the method comprising:
    selecting specific contents that will subsequently be pre-loaded into the cache when corresponding circumstances are detected;
    for each selected specific contents, determining the corresponding circumstances for pre-loading the specific contents;
    monitoring, at the mobile terminal, circumstances of the mobile terminal;
    when the corresponding circumstances for pre-loading the specific contents are detected among the circumstances of the mobile terminal, determining whether the specific contents are already present in cache; and
    if the specific contents are not present in cache, pre-loading the specific contents into the cache when the corresponding circumstances are detected among the circumstances of the mobile terminal without receiving a request for the specific contents from an application or from a user input,
    wherein the selected specific contents are predetermined,
    wherein the pre-loading of the specific contents makes the specific contents available that would have been unavailable if not pre-loaded, and
    wherein the specific contents and the corresponding circumstances are determined by a user.

2. The method of claim 1, wherein the specific contents comprise at least one of data and an executable application.

3. The method of claim 2, wherein the specific contents comprise data stored on at least one of an external server, a cloud, and a social networking service.

4. The method of claim 1, wherein the specific contents are selected by the user.

5. The method of claim 4, further comprising
    monitoring a frequency of loading of contents,
    monitoring circumstances of when the contents are loaded, and
    if a predetermined minimal correspondence is determined between the frequency of loading the contents and the circumstances of when the contents are loaded, presenting to the user an option to add the contents to the specific contents.

6. The method of claim 4,
    wherein the user determines at least one group of at least one specific contents, and
    wherein all specific contents in the group are automatically loaded into cache when the circumstances for pre-loading the group are detected.

7. The method of claim 1, wherein the corresponding circumstances for pre-loading are selected by the user.

8. The method of claim 1, wherein the corresponding circumstances for pre-loading comprise at least one of powering on the mobile terminal, a state of the mobile terminal, a local time, a geographic location, received news information, received or detected weather information, a detection of at least one predetermined wireless signals, a scheduled event, and a proximity to at least one person, place, object, or signal.

9. The method of claim 8, wherein the wireless signals comprise at least one of a WiFi signal, a Bluetooth signal, a Near Field Communication (NFC) signal, a Global Positioning System (GPS) signal, a Zigbee signal, a Z-wave signal, a cellular phone tower signal, and an identifying mobile phone signal.

10. The method of claim 8, wherein the circumstances of the mobile terminal are determined on a basis of at least one of a camera input, a microphone input, and a check-in service.

11. The method of claim 10, wherein the camera input comprises a picture or video image including at least one unique recognized person, place, landmark, or object.

12. The method of claim 8, wherein the state of the mobile terminal comprises at least one of a velocity, a direction, an orientation, and a determined environment.

13. The method of claim 1, wherein if an available amount of cache is below a predetermined level, the specific contents for pre-loading are determined on a priority basis.

14. The method of claim 13, wherein the priority is selected by the user.

15. The method of claim 13, wherein the priority is determined according to a greatest number of corresponding detected circumstances for pre-loading.

16. The method of claim 13, wherein the priority comprises weighting the specific contents.

17. The method of claim 13, wherein the priority comprises weighting the circumstances for pre-loading.

18. The method of claim 1, wherein if the corresponding circumstances for pre-loading relate to a person, the specific contents comprise all available previous communications with the person, previous communications in which the person has been identified, data and social applications related to the person, applications which have been used to interact with the person, data and social applications according to the person's information in a phone book, and data in which the person is tagged or mentioned.

19. A mobile terminal comprising:
a cache;
an input-output unit; and
at least one processor configured to:
select specific contents that will subsequently be pre-loaded into the cache when corresponding circumstances are detected,
determine for each selected specific contents the corresponding circumstances for pre-loading the specific contents,
monitor, at the mobile terminal, circumstances of the mobile terminal,
determine, when the corresponding circumstances for pre-loading the specific contents are detected among the circumstances of the mobile terminal, whether the specific contents are already present in cache, and
pre-load, if the specific contents are not present in cache, the specific contents into the cache when the corresponding circumstances are detected among the circumstances of the mobile terminal without receiving a request for the specific contents from an application or from a user input,
wherein the selected specific contents are predetermined,
wherein the pre-loading of the specific contents makes the specific contents available that would have been unavailable if not pre-loaded, and
wherein the specific contents and the corresponding circumstances are determined by a user.

20. The mobile terminal of claim 19, wherein the specific contents comprise at least one of data and an executable application.

21. The mobile terminal of claim 20,
further comprising a communication unit,
wherein the specific contents comprise data stored on at least one of an external server, a cloud, and a social networking service.

22. The mobile terminal of claim 19, wherein the specific contents are selected by the user.

23. The mobile terminal of claim 22, wherein the at least one processor monitors a frequency of loading of contents, monitors circumstances of when the contents are loaded, and presents to the user, if a predetermined minimal correspondence is determined between the frequency of loading the contents and the circumstances of when the contents are loaded, an option to add the contents to the specific contents.

24. The mobile terminal of claim 22,
wherein the user determines at least one group of at least one specific contents, and
wherein all specific contents in the group are automatically loaded into cache when the corresponding circumstances for pre-loading the group are detected.

25. The mobile terminal of claim 19, wherein the corresponding circumstances for pre-loading are selected by the user.

26. The mobile terminal of claim 19, wherein the corresponding circumstances for pre-loading comprise at least one of powering on the mobile terminal, a state of the mobile terminal, a local time, a geographic location, received news information, received or detected weather information, a detection of at least one predetermined wireless signals, a scheduled event, and a proximity to at least one person, place, object, or signal.

27. The mobile terminal of claim 26, further comprising a communication unit for receiving the wireless signals comprising at least one of a WiFi signal, a Bluetooth signal, a Near Field Communication (NFC) signal, a Global Positioning System (GPS) signal, a Zigbee signal, a Z-wave signal, a cellular phone tower signal, and an identifying mobile phone signal.

28. The mobile terminal of claim 26,
further comprising at least one of a camera for receiving a camera input, a microphone for receiving an audio input, and a communication unit for communicating with a check-in service,
wherein the circumstances of the mobile terminal are determined on a basis of at least one of the camera input, the audio input, and the check-in service.

29. The mobile terminal of claim 28, wherein the camera input comprises a picture or video image including at least one unique recognized person, place, landmark, or object.

30. The mobile terminal of claim 26, wherein the state of the mobile terminal comprises at least one of a velocity, a direction, an orientation, and a determined environment.

31. The mobile terminal of claim 19, wherein if an available amount of cache is below a predetermined level, the specific contents for pre-loading are determined on a priority basis.

32. The mobile terminal of claim 31, wherein the priority is selected by the user.

33. The mobile terminal of claim 31, wherein the priority is determined according to a greatest number of corresponding detected circumstances for pre-loading.

34. The mobile terminal of claim 31, wherein the priority comprises weighting the specific contents.

35. The mobile terminal of claim 31, wherein the priority comprises weighting the corresponding circumstances for pre-loading.

36. The mobile terminal of claim 19, wherein if the corresponding circumstances for pre-loading relate to a person, the specific contents comprise all available previous communications with the person, previous communications in which the user has been identified, data and social applications related to the person, data and social applications according to the person's information in a phone book, applications which have been used to interact with the person, and data in which the person is tagged or mentioned.

* * * * *